(12) United States Patent
Smith et al.

(10) Patent No.: US 10,927,786 B1
(45) Date of Patent: Feb. 23, 2021

(54) BI-METALLIC PISTON RING CARRIER

(71) Applicant: MAHLE International GmbH, Stuttgart (DE)

(72) Inventors: Thomas J. Smith, Muskegon, MI (US); Likhit Sethi, Brooklyn, NY (US)

(73) Assignee: MAHLE International GmbH, Stuttgart (DE)

( * ) Notice: Subject to any disclaimer, the term of this patent is extended or adjusted under 35 U.S.C. 154(b) by 0 days.

(21) Appl. No.: 16/668,314

(22) Filed: Oct. 30, 2019

(51) Int. Cl.
*F02F 3/00* (2006.01)
*B22D 19/00* (2006.01)

(52) U.S. Cl.
CPC ........ *F02F 3/0023* (2013.01); *B22D 19/0027* (2013.01); *F05C 2201/021* (2013.01); *F05C 2201/028* (2013.01); *F05C 2201/0436* (2013.01)

(58) Field of Classification Search
CPC ....... F16J 9/203; F16J 9/22; F16J 9/26; Y10T 29/49261; Y10T 29/49274; Y10T 29/49265
USPC ...................................................... 123/193.6
See application file for complete search history.

(56) References Cited

U.S. PATENT DOCUMENTS

| | | | |
|---|---|---|---|
| 1,946,081 A * | 2/1934 | Koch | F02F 3/285 92/213 |
| 3,475,804 A * | 11/1969 | Breen | F02B 23/0675 29/888.047 |
| 4,336,077 A * | 6/1982 | Leach | B23P 15/10 148/517 |
| 4,643,079 A * | 2/1987 | Brann | C21D 5/00 123/193.6 |
| 6,318,330 B1 * | 11/2001 | Kestner | F02F 1/004 123/193.2 |
| 9,638,322 B2 * | 5/2017 | Smith | F16J 9/26 |
| 2006/0278180 A1 | 12/2006 | Scharp | |

OTHER PUBLICATIONS

Yamamoto et al., "Steel-Iron Double-Layered Cylinder Liner Produced by Centrifugal Casting," JSME International Journal, Series A, vol. 38, No. 4, 1994, pp. 588-593.

* cited by examiner

*Primary Examiner* — Long T Tran
*Assistant Examiner* — James J Kim
(74) *Attorney, Agent, or Firm* — Collard & Roe, P.C.

(57) ABSTRACT

A ring carrier for a piston for an internal combustion engine is formed by a carrier body having an outer circumferential surface, an inner circumferential surface, a top surface and a bottom surface, with at least one ring groove formed in the outer circumferential surface. An outer circumferential portion of the ring carrier is formed of gray iron, and an inner circumferential portion is formed of ductile iron. A transition region between the outer circumferential portion and the inner circumferential portion intersects upper and lower flanks of the ring groove, so that an outer circumferential extent of the flanks is formed of gray iron and an inner circumferential extent of the flanks is formed of ductile iron.

10 Claims, 2 Drawing Sheets

BI-METALLIC PISTON RING CARRIER

BACKGROUND OF THE INVENTION

1. Field of the Invention

This invention relates to a ring carrier for a piston for a combustion engine. In particular, the invention relates to a ring carrier formed of two different metals, namely, ductile iron and grey iron that may be austenitic.

2. The Prior Art

Piston ring carriers are formed around the outside of the crown of the piston, and have ring grooves machined therein, to hold different piston rings. The piston bodies themselves are often formed of aluminum, but have a ring carrier made of iron for durability. In selecting a material for the ring carrier, gray iron is often used, due to its wear resistance, as the ring carrier is under constant stress due to its contact with the cylinder liner. However, gray iron can have durability issues, and can crack under impact, particularly at the interior corners of the ring groove. Ductile iron, also known as spheroidal graphite cast iron, is characterized by high strength, flexibility, durability and elasticity. However, ductile iron does not have good wear resistance and is not an ideal material for the exterior faces of a ring carrier. Ring carriers of pure grey iron have a higher risk of damage to the engine during LSPI (low speed pre-ignition) events due to the risk cracking of the ring groove at the corners of the groove, which can damage the piston and cause engine failure. Therefore, it would be ideal to have a ring carrier that has the wear resistance of gray iron with the strength of ductile iron to eliminate the risk of cracking of the ring groove under high pressure.

SUMMARY OF THE INVENTION

It is therefore an object of the invention to provide ring carrier for a piston that has strength and durability yet also exhibits wear resistance on the face surfaces.

These and other objects are accomplished by a ring carrier for a piston for an internal combustion engine formed by a carrier body having an outer circumferential surface, an inner circumferential surface, a top surface and a bottom surface, with at least one ring groove formed in the outer circumferential surface. An outer circumferential portion of the ring carrier is formed of gray iron, and an inner circumferential portion is formed of ductile iron. The gray iron on the outer circumference adds to the machinability. This allows for a reduction in the manufacturing cost. A transition region between the outer circumferential portion and the inner circumferential portion intersects upper and lower flanks of the ring groove, so that an outer circumferential extent of the flanks is formed of gray iron and an inner circumferential extent of the flanks is formed of ductile iron. This way, the ring carrier has the benefits of being mostly formed by the stronger, more resilient ductile iron, yet has the wear resistance of gray iron on the face surface of the ring carrier and the flanks of the groove. This is especially important around the first (uppermost) ring groove that holds the compression ring. This ring is subject to the peak pressure spikes that may happen during an LSPI event or pre-ignition knocks, and reinforcement of the ring carrier with ductile iron reduces the risk of any damage to the piston during high pressure events.

Preferably, the transition region is located at a position such that at least 70% of the length of the flanks of the ring groove are formed of gray iron. Preferably, the amount of gray iron is maximized over the depth of the ring groove, but not extending entirely to the interior corners of the groove. It is important that the interior corners of the groove be formed of ductile iron, due to its greater resistance to cracking.

The groove preferably has a height of between 1.0 and 1.5 mm, with a preferred height of 1.2 mm, and a depth of between 3-4 mm. The transition region preferably is located between 2 and 2.5 mm from the outer surface of the ring carrier.

The ring carrier is suitable for casting into an aluminum piston body, which has a piston crown, pin bosses and a piston skirt. It has been found that the bi-metallic ring carrier of the invention has no adverse effects on the Alfin bond formed during casting, as compared to a pure grey iron ring carrier, even over the transition region.

The ring carrier of the invention is formed by using a centrifugal casting process, and casting the entire carrier in one molding process in a single mold. This is done by first adding a predetermined amount of molten gray iron to the rotating casting mold, and then adding molten gray iron doped with magnesium to the same mold, so that the outer circumferential portion is formed of gray iron, and the inner circumferential portion is formed of ductile iron, which was created by the magnesium converting the graphite in the gray iron into spheroidal graphite during the casting process. Once the ring carrier is cast, it is then cast into piston body, and finally the ring groove is cut in the outer circumference. The casting process is controlled so that the proper amount of undoped gray iron is cast before adding the doped product, to ensure the right depth of the transition region. The amounts of the different metals can be controlled by weighing the amount of metal needed prior to the casting process and adding only the precise weight required to place the transition region in the desired area.

BRIEF DESCRIPTION OF THE DRAWINGS

Other objects and features of the present invention will become apparent from the following detailed description considered in connection with the accompanying drawings. It is to be understood, however, that the drawings are designed as an illustration only and not as a definition of the limits of the invention.

In the drawings, wherein similar reference characters denote similar elements throughout the several views.

DETAILED DESCRIPTION OF THE PREFERRED EMBODIMENT

Figure 1:
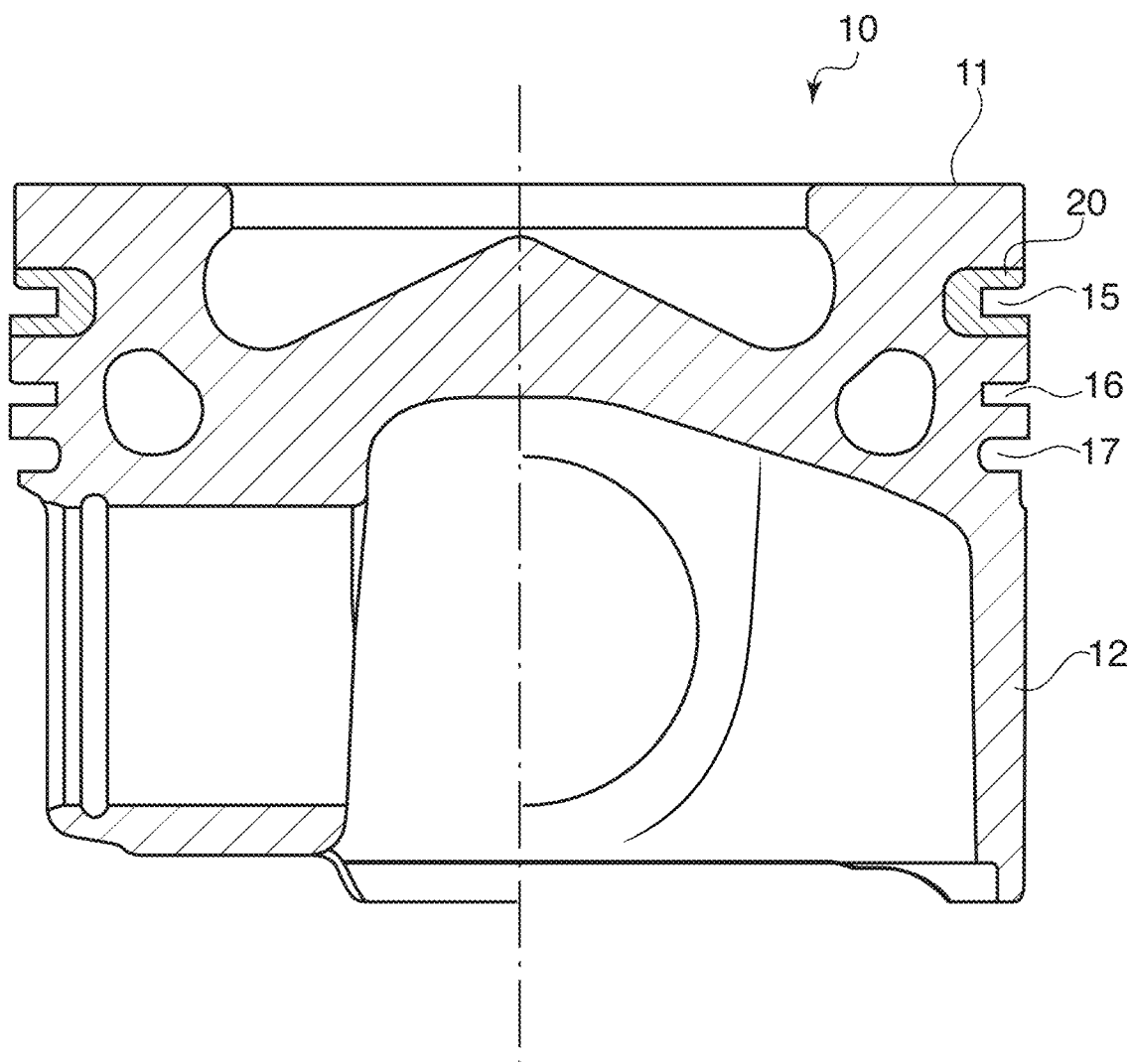
FIG. 1 shows a cross-sectional view of a piston with a ring carrier insert according to the invention.

Referring now in detail to the drawings and, in particular, FIG. 1 shows a cross-sectional view of a piston 10 having a circumferential ring carrier 20 that has been cast into piston 10. Piston 10 can be of any suitable configuration, be formed of any number of separate parts that are welded or fixed together, and can have be with or without a circumferential cooling channel. The piston 10 shown is only a representative of the many types of pistons into which ring carrier 10 can be cast. Piston 10 is preferably formed of aluminum, and ring carrier 20 is formed of iron, in particular a combination of gray iron and ductile iron as described below. Piston 10 comprises a piston crown 11, a piston skirt 12 and two pin bosses 13 for holding a piston pin. The ring carrier 20 is first cast in the manner described below and then placed into the casting mold for the piston, and the aluminum piston material is cast around ring carrier 20 to form the piston. The ring grooves 15, 16, 17 are then machined into the finished piston and ring carrier.

Figure 2:
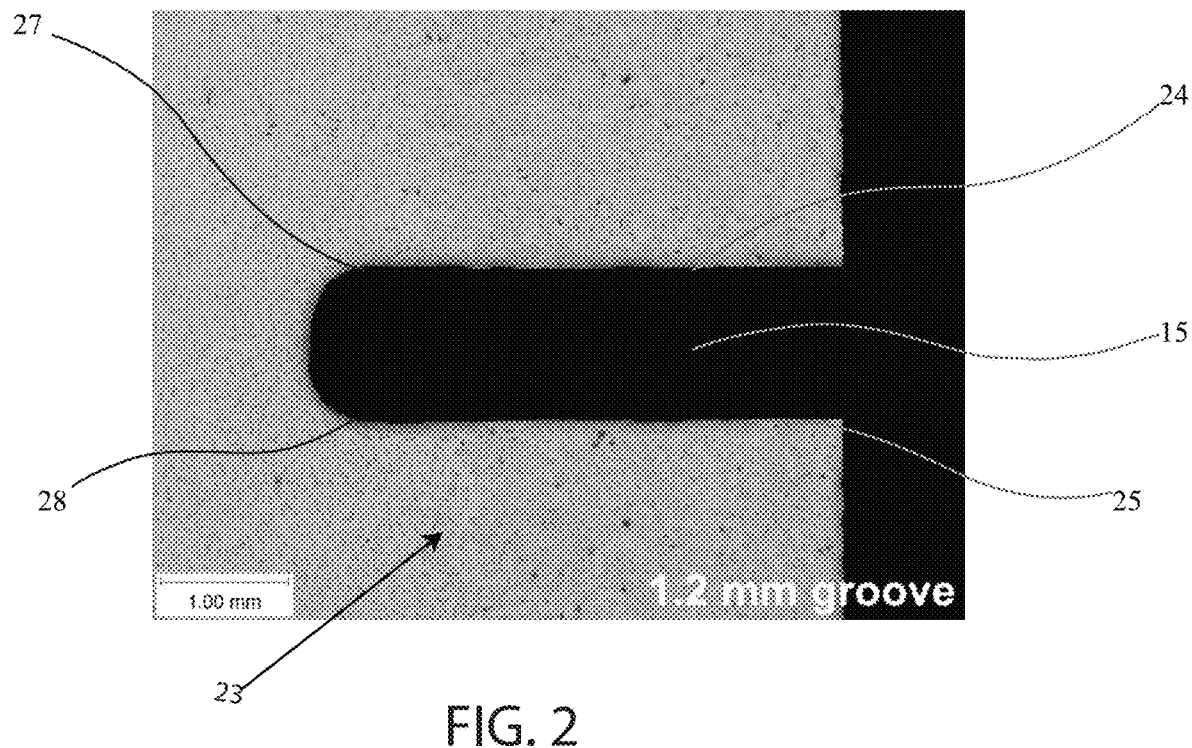
FIG. 2 shows an enlarged cross-section of the ring groove of the ring carrier according to the invention.
Figure 3:
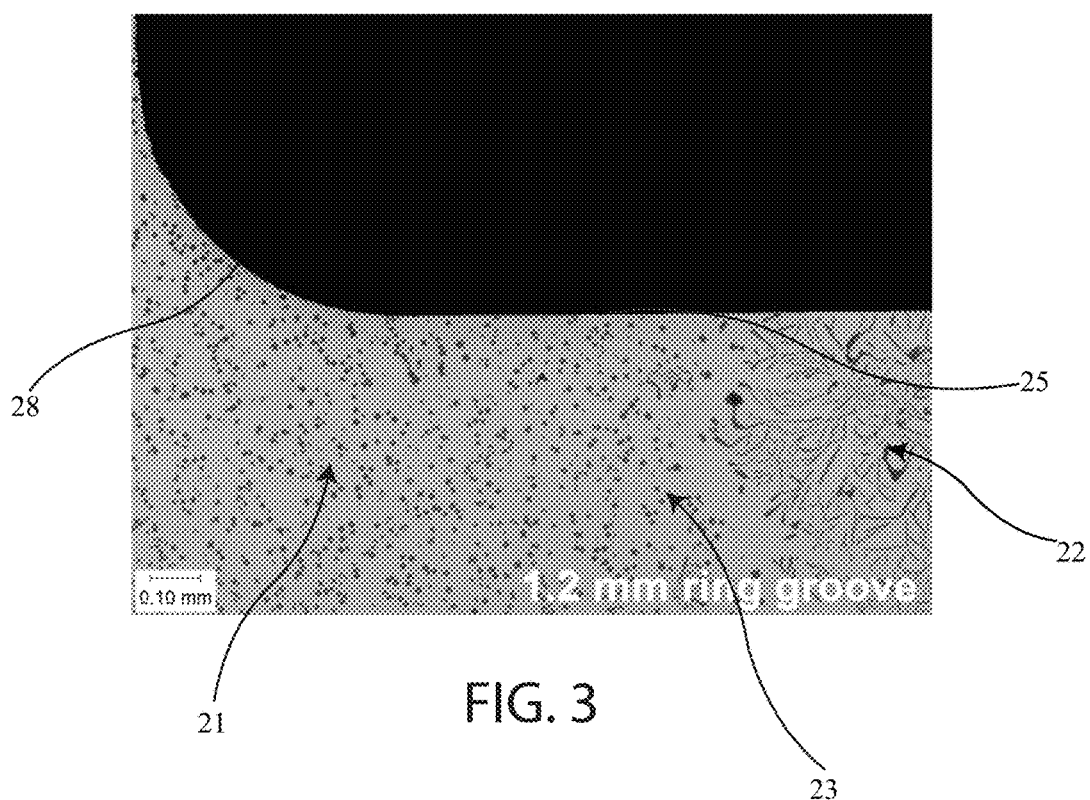
FIG. 3 shows an enlargement of the transition region of the ring carrier according to the invention.

Enlarged photographs of ring carrier 20 are shown in FIGS. 2 and 3. Ring carrier 20 is formed of iron, with the outer circumferential portion 22 being formed from gray iron, and the inner circumferential portion 21 being formed of ductile iron. The gray and ductile iron is in austenitic form with the graphite transitioning due to the magnesium addition into the metal during casting. As can be seen in the photographs, a transition region 23 extends across flanks 24, 25 of the ring groove 15, so that the gray iron forms the majority of the flanks 24, 25, and the inner vertical wall 26 and particularly the corners 27, 28 are formed from ductile iron. The photographs show the ductile iron having spheroidal shaped graphite particles embedded therein, while the gray iron contains graphite in flake form. The transition region between the ductile iron and gray iron takes place such that a maximum extent of the flanks 24, 25 are formed of gray iron, and the corners, which are more prone to cracking if formed of gray iron, are formed of ductile iron.

The smooth transition between the gray iron and ductile iron can be achieved by centrifugal casting the ring carrier 20 in a single mold, in a single molding process. The casting process is begun by pouring molten gray iron into the ring-shaped mold to cast the outer circumference of the mold in gray iron, then, as the desired transition region is reached, the molten iron is doped with magnesium, so that the inner circumference of the ring is cast with ductile, iron, as the magnesium converts the graphite in the gray iron from flake form into spheroidal form, thus converting the molten gray iron that has been doped into ductile iron. The ductile iron is poured into the mold until the desired thickness of the ring carrier is obtained. The transition region can be precisely controlled by weighing the amount of gray iron to be added to the mold prior to adding the doped iron. Preferably, the transition region 23 may be at a length that is at least 70% of the length of the flanks of the ring carrier 20. In some variations, the casting may further optimize the ring carrier 20, and reduce the transition region to be adjacent the corners 27, 28, to maximize the length of gray iron on the flanks 24, 25. The casting process can take place in a conventional centrifugal casting using standard molds for ring carrier.

Accordingly, while only a few embodiments of the present invention have been shown and described, it is obvious that many changes and modifications may be made thereunto without departing from the spirit and scope of the invention.

What is claimed is:

1. A ring carrier for an piston for an internal combustion engine, comprising a carrier body having an outer circumferential surface, an inner circumferential surface, a top surface and a bottom surface, with at least one ring groove formed in the outer circumferential surface, the at least one ring groove having upper and lower flanks, wherein an outer circumferential portion of the ring carrier is formed of gray iron, and an inner circumferential portion is formed of ductile iron.

2. The ring carrier according to claim 1, wherein a transition region between the outer circumferential portion and the inner circumferential portion intersects the upper and lower flanks of the at least one ring groove, so that an outer circumferential extent of the flanks is formed of gray iron and an inner circumferential extent of the flanks is formed of ductile iron.

3. The ring carrier according to claim 1, wherein the transition region is located at a position such that at least 70% of a length of the flanks of the at least one groove are formed of gray iron.

4. The ring carrier according to claim 2, wherein the transition region is adjacent a radius defining corners of the ring carrier.

5. The ring carrier according to claim 1, wherein the at least one groove has a height of between 1.0 and 1.5 mm and a depth of between 3 and 4 mm.

6. A piston for an internal combustion engine having a piston crown, a pair of pin bosses and a piston skirt, wherein the piston crown comprises a ring carrier according to claim 1.

7. The piston according to claim 6, wherein the piston crown, pin bosses and piston skirt are formed of aluminum.

8. A method for forming a ring carrier for a piston for an internal combustion engine, comprising casting a ring carrier body using a centrifugal casting method, the ring carrier body having an inner circumference and an outer circumference, wherein in a first casting step molten gray iron is added to a casting mold, and in a second casting step, molten gray iron doped with magnesium is added to the casting mold, so that the finished ring carrier has an outer circumferential portion formed of gray iron, and an inner circumferential portion formed of ductile iron, and cutting at least one ring groove in the outer circumference so that a transition region between the outer circumferential portion and the inner circumferential portion intersects flanks the ring groove.

9. A method for forming a piston for an internal combustion engine, comprising:
    casting a ring carrier body using a centrifugal casting method, wherein in a first casting step molten gray iron is added to a centrifugal casting mold, and in a second casting step, molten gray iron doped with magnesium is added to the casting mold, so that the cast ring carrier has an outer circumferential portion formed of gray iron, and an inner circumferential portion formed of ductile iron,
    casting an aluminum piston body around the ring carrier in a casting process; and
    finishing the piston by cutting at least one ring groove in the ring carrier, so that a transition region between the outer circumferential portion and the inner circumferential portion intersects flanks of the at least one ring groove.

10. The method according to claim 9, wherein the at least one ring groove is an uppermost ring groove in the piston.

\* \* \* \* \*